United States Patent
Lenczuk

[19]

[11] Patent Number: 5,826,414
[45] Date of Patent: Oct. 27, 1998

[54] DEVICE FOR CUTTING VEGETATION

[76] Inventor: Zeno Lenczuk, 2022 Wintergreen, Mount Prospect, Ill. 60056

[21] Appl. No.: 642,557

[22] Filed: May 3, 1996

[51] Int. Cl.$^6$ .................................................. A01D 34/64
[52] U.S. Cl. .............................. 56/14.7; 56/17.5; 56/16.7
[58] Field of Search .................................... 56/14.7, 15.7, 56/16.7, 17.1, 17.5, 11.8, DIG. 14, 14.9, DIG. 22

[56] References Cited

U.S. PATENT DOCUMENTS

| | | | |
|---|---|---|---|
| 2,732,675 | 1/1956 | Smith et al. | 56/6 |
| 3,526,083 | 9/1970 | Barry et al. | 56/15.7 X |
| 4,760,686 | 8/1988 | Samejima et al. | 56/DIG. 22 |
| 4,779,406 | 10/1988 | Schroeder | 56/DIG. 22 |
| 4,916,889 | 4/1990 | Molstad | 56/14.9 |
| 4,956,965 | 9/1990 | Parsons, Jr. | 56/15.1 |
| 5,220,773 | 6/1993 | Klaeger | 56/10.4 |
| 5,603,205 | 2/1997 | Foster | 56/16.7 |

*Primary Examiner*—Heather Shackelford
*Attorney, Agent, or Firm*—Fitch, Even, Tabin & Flannery

[57] ABSTRACT

A cutting device is provided with a power unit and a cutting unit connected at a single pivot point. The cutting unit preferably includes a cutting deck with multiple cutting blades spaced from the point of pivot connection. The cutting unit is preferably mounted on a frame supported by swivel casters. The power unit containing an internal combustion engine or other power source is preferably mounted on drive wheels.

23 Claims, 10 Drawing Sheets

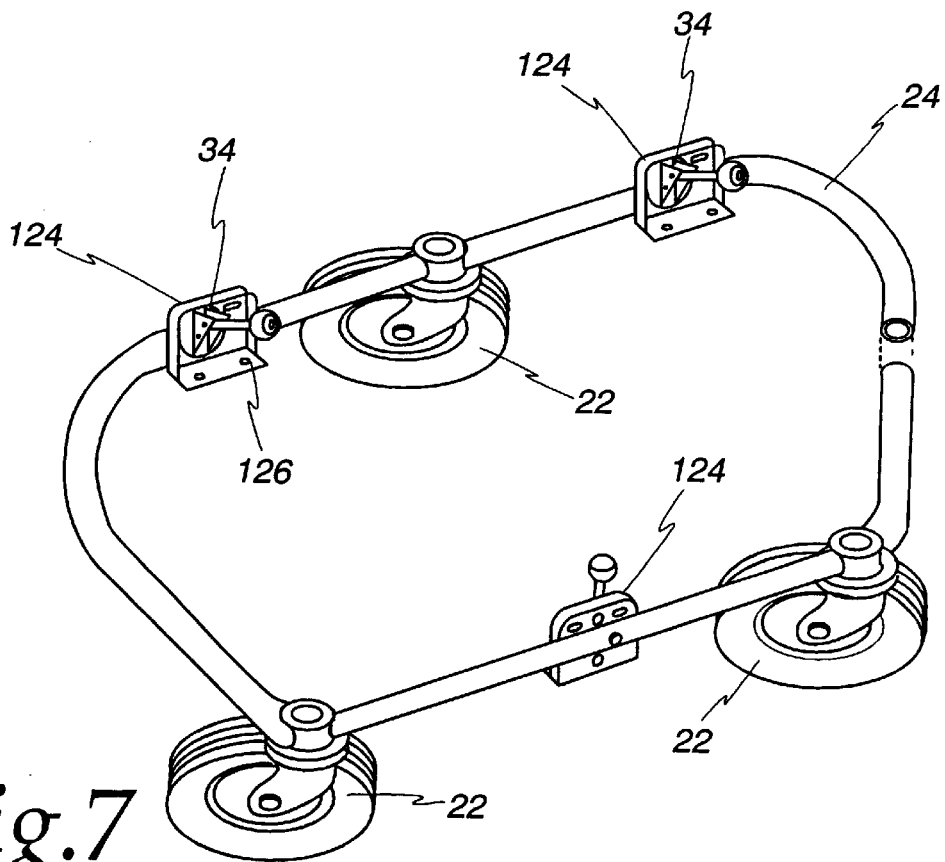
Fig.7
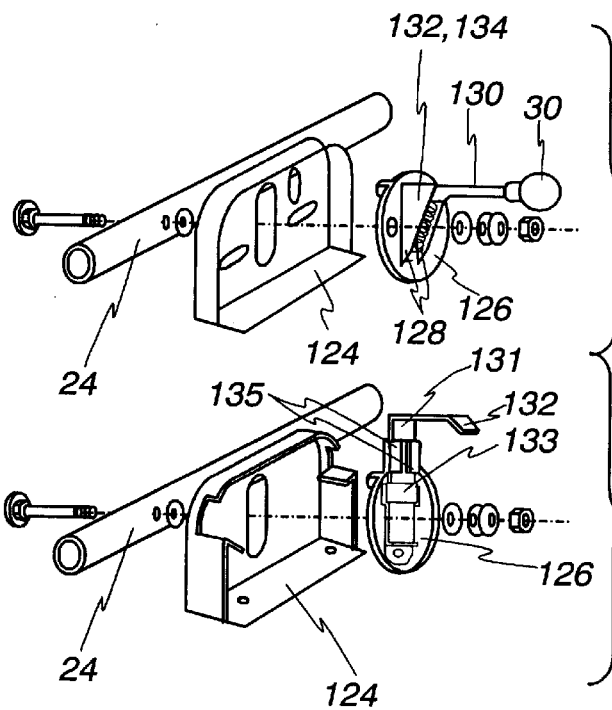
Fig.8a
Fig.8b

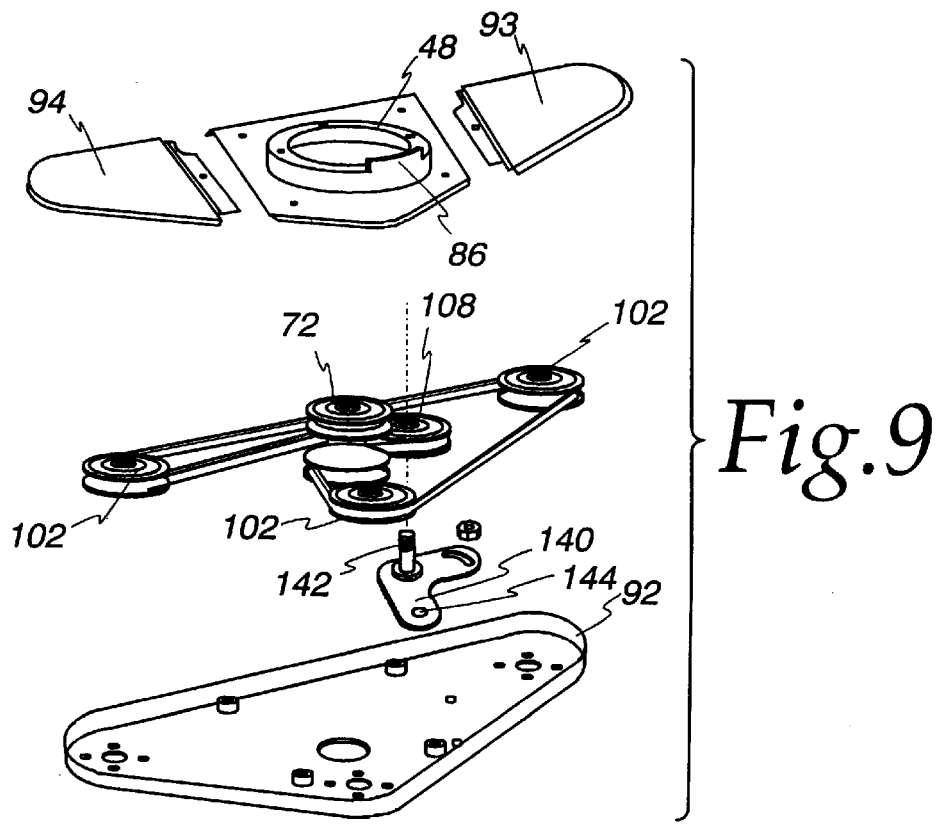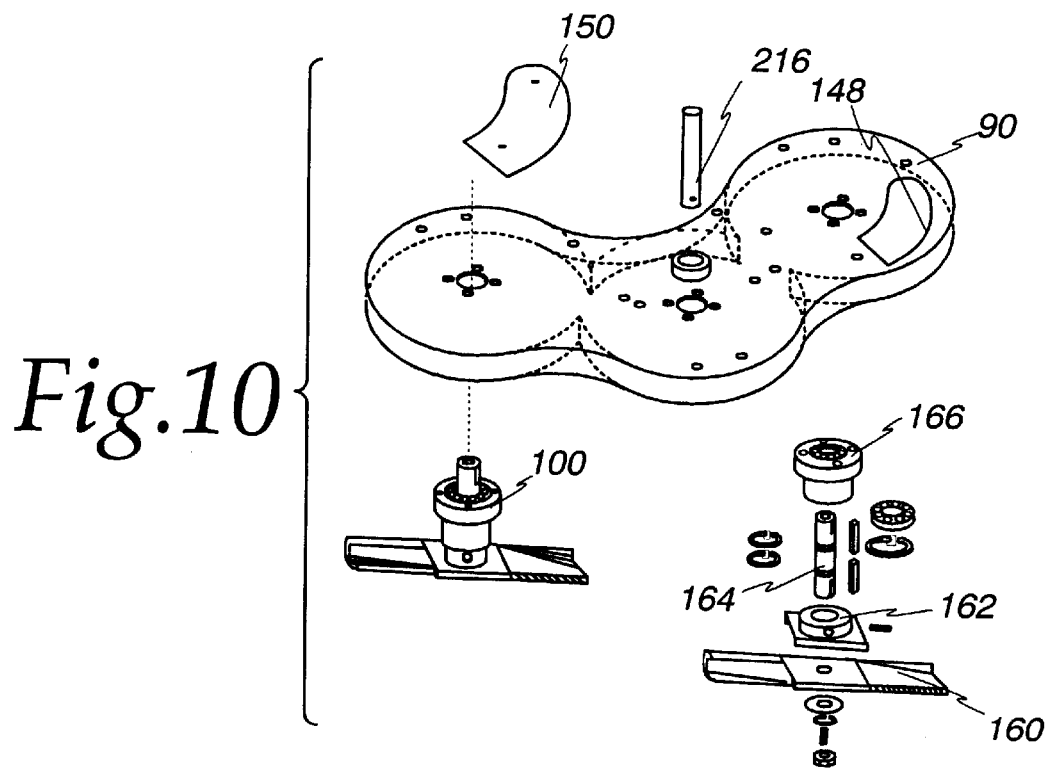

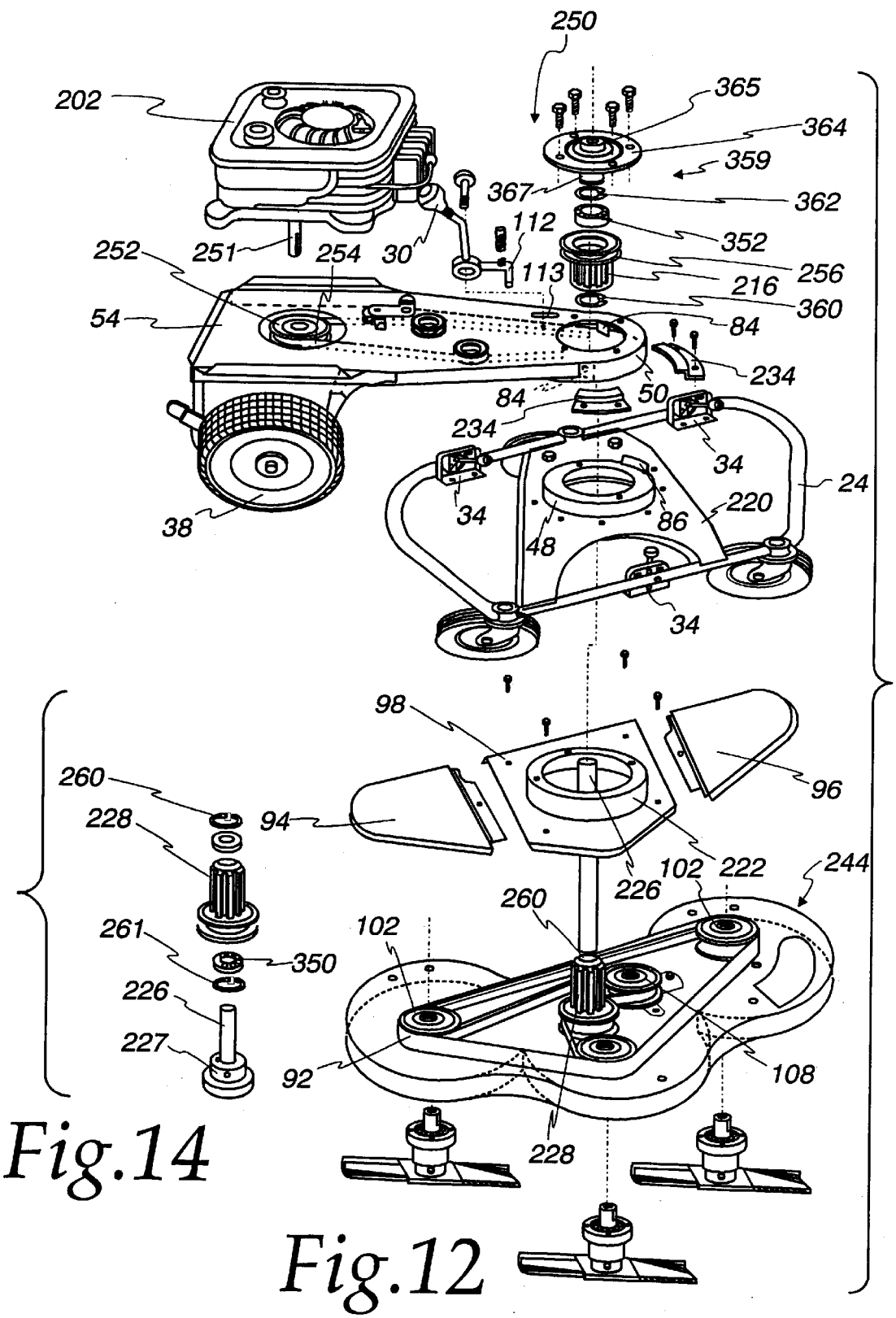

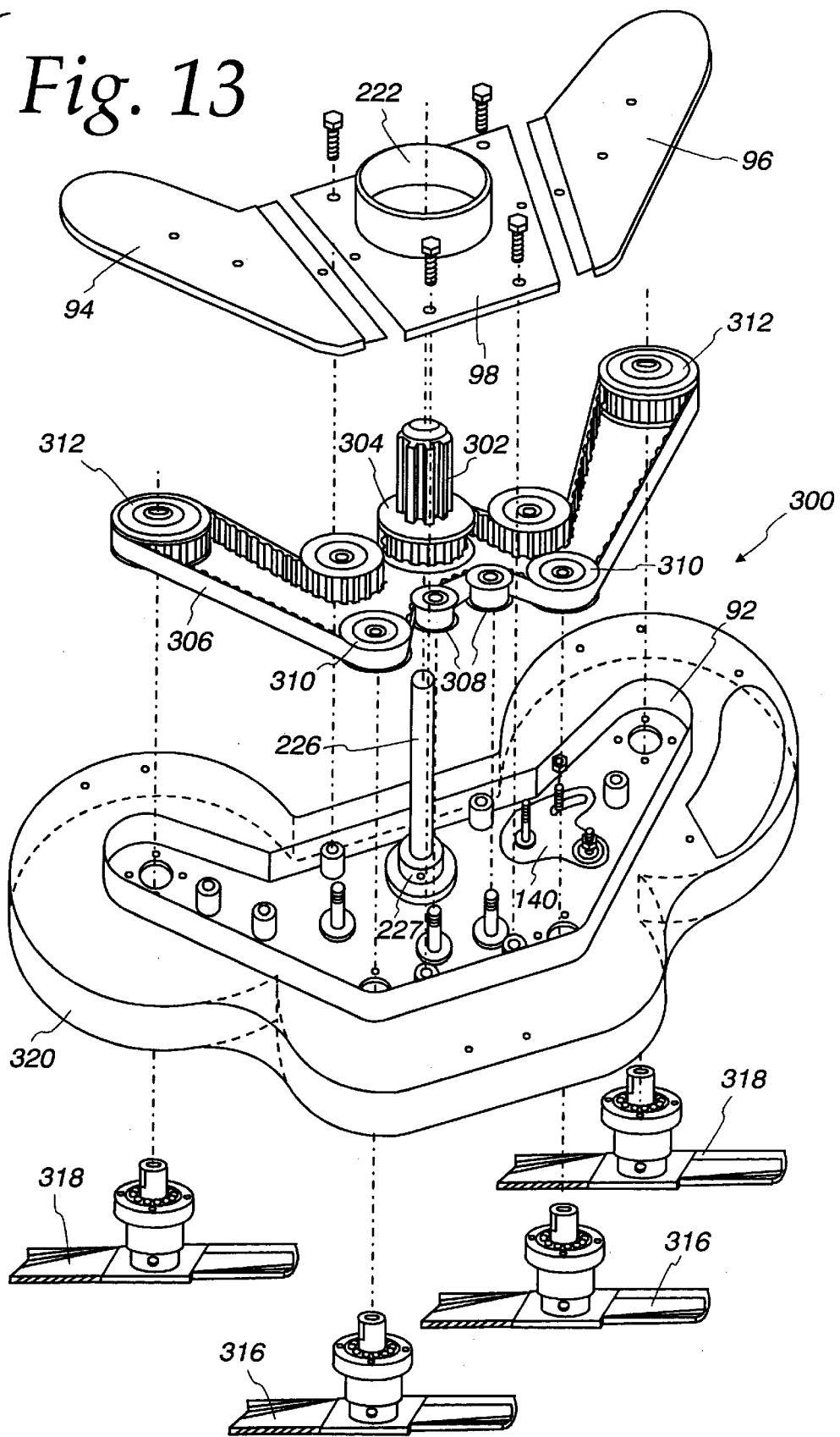

DEVICE FOR CUTTING VEGETATION

BACKGROUND OF THE INVENTION

1. Field of the Invention

The present invention pertains to devices for cutting vegetation, and in particular to such devices having multiple cutting blades.

2. Description of the Related Art

Devices for cutting vegetation currently in use today may be broadly classified as either small hand-held tools or tools which are usually too heavy to be hand held, which are usually mounted on wheeled frames. The present invention is concerned with the latter type of device. Many homeowners and landscaping maintenance personnel are familiar with lawn mower devices of the type having a single large cutting blade. Such devices are popular because they are inexpensive to manufacture and are simple to operate. However, there is a practical limit to the size of the cutting blade which can be employed in these types of devices. It is desirable, for large areas and for commercial operations of various sizes, that the number of passes through an area of vegetation be reduced to a minimum. This can be most readily accomplished if the width of the cutting path, or swath, is made as large as possible. It has been known for some time that larger cutting swaths are possible if a cutting device is provided with multiple cutting heads, mounted on a common housing or deck in such a way that the cutting paths of individual blades can be laterally offset from one another so as to increase the width of the overall cutting swath. Examples of such devices are given in U.S. Pat. Nos. 2,732,675; 4,916,889 and 5,220,773. Devices of the above-described type have proved to offer substantial advantages in reducing the amount of passes and therefore reducing the amount of time required to service an area of vegetation. However, several drawbacks have been encountered with such cutting devices. For example, a manufacturer would prefer to expand its marketing base wherever possible. However, the size of conventional lawn mowers for residential use is limited mainly by the size of garage door and tool shed openings, as well as gate openings through which the cutting device is required to pass when it is placed in operation. Conventional multiple blade cutting devices have proven to be too wide for residential use, and accordingly, manufacturers of such devices have not been able to significantly penetrate these markets.

Further, problems have been encountered with such devices in commercial use. For example, oftentimes the vegetation-cutting equipment is not stored at a commercial site, but rather is brought to the site by transient work crews. Typically, the vegetation-cutting equipment is transported in a trailer or a truck or similar vehicle. Because of restrictions on vehicle sizes, only limited space is available for stowing the cutting equipment. As mentioned, there are advantages for making the cutting equipment of a larger size. However, this design consideration is at odds with the limited space available for typical transport to a job site. Further, with increasing emphasis on security, gate openings similar in size to that encountered in a residence are being encountered at commercial sites.

Frequently, in commercial applications, a landscaping maintenance crew will be asked to mow areas of lawn, where grass is cultivated and other types of vegetation are excluded. As will be appreciated, this is a controlled environment, and the demands to be placed on the cutting equipment can be readily anticipated. However, from time to time, the same work crew may be asked to mow areas outside of a lawn where various types of vegetation have been allowed to grow, and where debris may have inadvertently accumulated, hidden by the vegetation. In this instance, the demands on the cutting equipment cannot be easily predicted, and accordingly, it is desirable to make the cutting equipment as rugged as possible.

SUMMARY OF THE INVENTION

It is an object of the present invention to provide a device for cutting vegetation which employs multiple cutting blades arranged so as to have an increased cutting swath.

Another object of the present invention is to provide a cutting device of the above-described type which is readily configurable between a reduced width configuration for passage through doorways, gate openings and the like and an increased width configuration for time-efficient mowing.

A further object of the present invention is to provide a cutting device of the above-described type which is readily maneuverable, i.e., turnable, without requiring the device to be lifted while turning.

These and other objects according to principles of the present are provided in a device for cutting vegetation, comprising:

a power unit including a source of drive power mounted on a support, and a first pivot connection part carried on the support;

a cutting unit including a frame, a deck carried on the frame, at least one cutting blade rotatably mounted on the deck and a second pivot connection part carried on the frame;

coupling means for coupling the source of drive power to the cutting blade; and said first and said second pivot connection parts joined together and cooperating so that the cutting unit is pivotally connected to the power unit about a pivot axis.

BRIEF DESCRIPTION OF THE DRAWINGS

FIG. 7 is a perspective view of a tubular frame for mounting the cutting unit;

FIGS. 8a and 8b are perspective views showing an assembly of parts for one of the height adjusters visible in FIG. 7;

FIG. 9 is an exploded perspective view of the drive system for the cutting blades;

FIG. 10 is an exploded perspective view of a cutting deck assembly;

FIG. 12 is an exploded perspective view of a further alternative cutting device;

FIG. 13 is an exploded perspective view of another cutting deck assembly; and

FIG. 14 is an exploded perspective view of a drive train assembly for the cutting device of FIG. 12.

DETAILED DESCRIPTION OF THE PREFERRED EMBODIMENT

Figure 1:
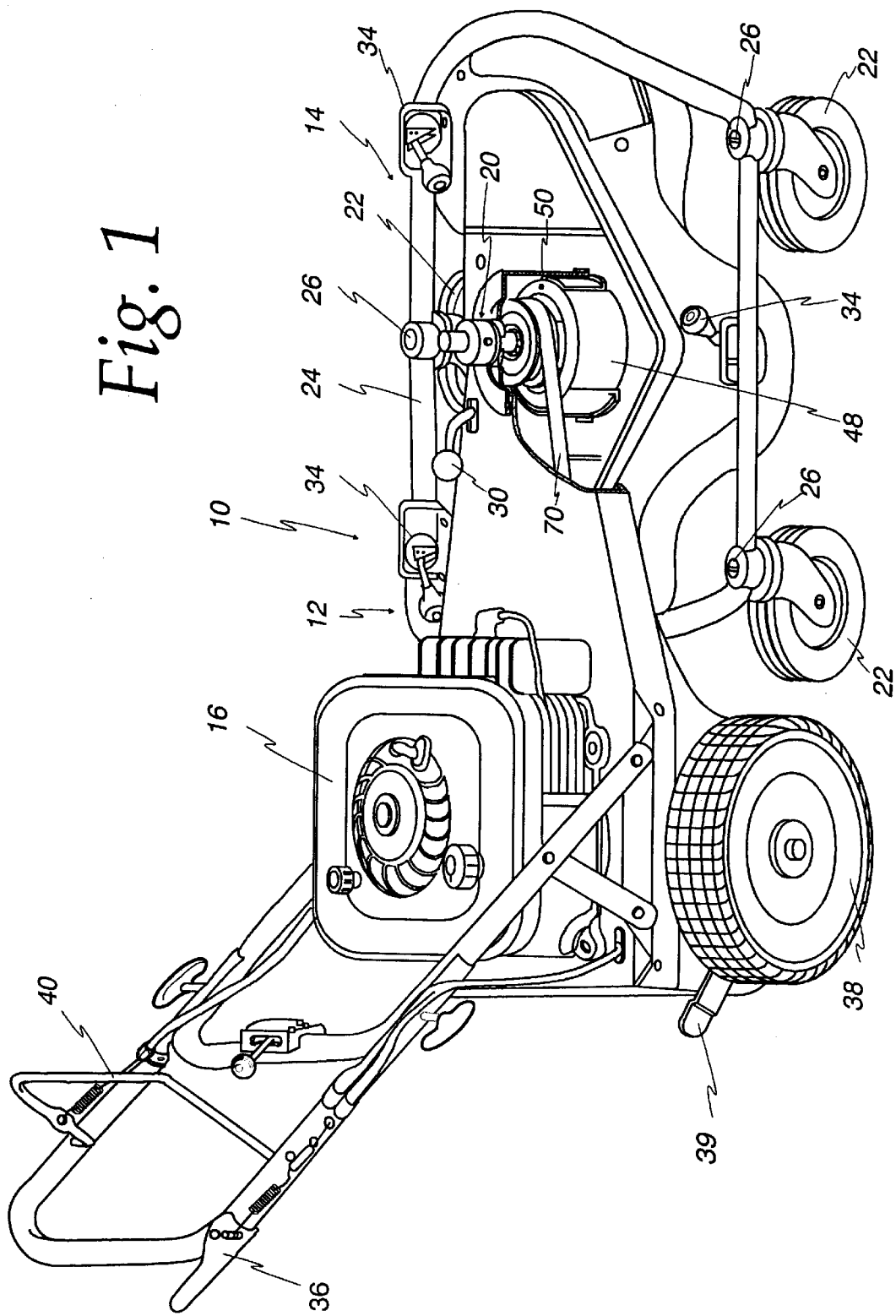
FIG. 1 is a perspective view of a cutting device illustrating principles according to the present invention.
Figures 2, 3:
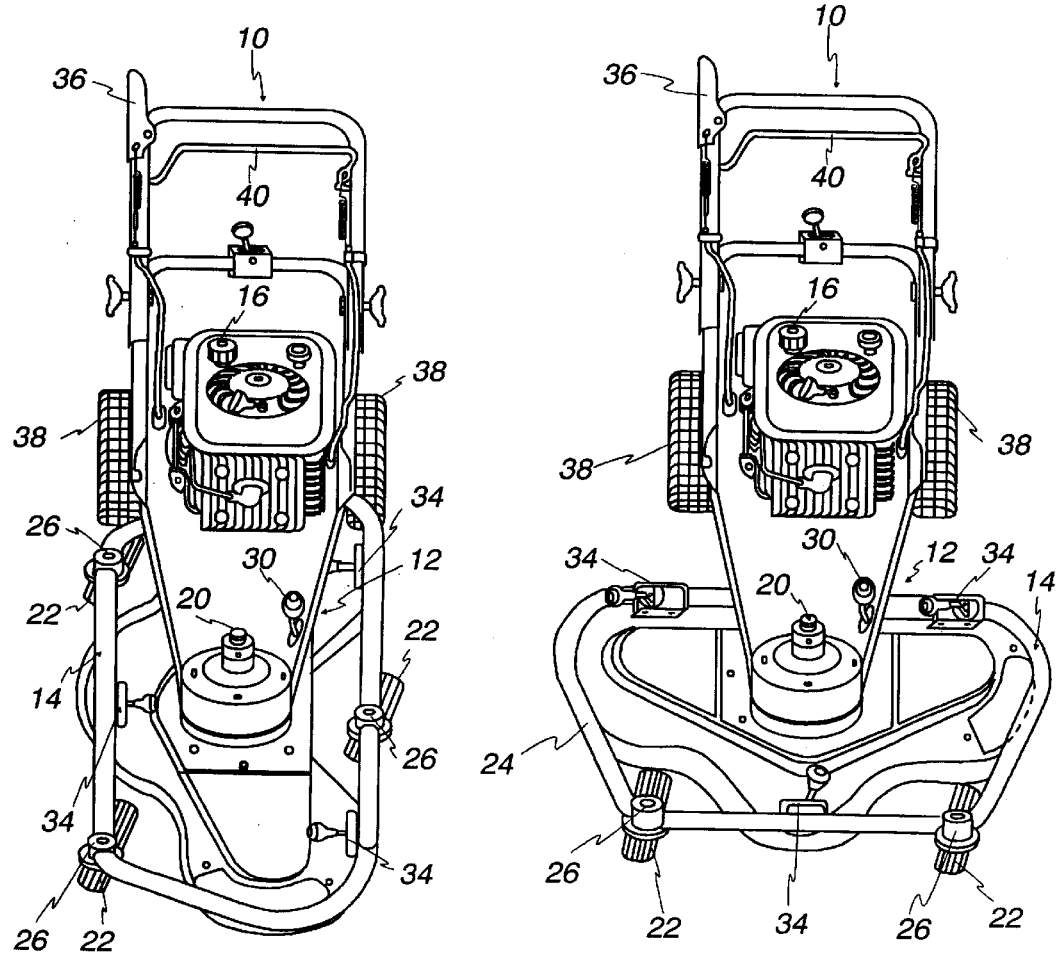
FIG. 2 is a perspective view taken from the front of the device, and with the cutting deck in a retracted position.
FIG. 3 is a view similar to that of FIG. 2, with the cutting deck in an extended position.

Turning now to the drawings, FIG. 1 shows a cutting device 10 having a power unit 12 and a cutting unit 14. In the preferred embodiment, the power unit 12 includes an internal combustion engine 16, although other types of power sources, such as an electric motor could be substituted therefor. As will be seen herein, the power unit 12 and cutting unit 14 are connected together at a single pivotal coupling generally indicated at 20. The cutting unit 14 is mounted on wheels 22 coupled to a tubular frame 24 by swivel castors 26. In FIG. 1, part of the power unit 12 is broken away to show the internal construction. As can be seen by comparing FIGS. 2 and 3, the tubular frame 24 rotates with respect to the axis of the pivotal coupling. FIG. 2 shows the cutting device in a retracted position, with the cutting deck rotated to assume a minimal width configuration. In FIG. 3, the cutting device is shown in an extended position, with the cutting deck rotated for a cutting swath of maximum width.

Various controls are provided for the cutting device. For example, a release handle 30 locks the cutting unit in the positions indicated in FIGS. 2 and 3, and releases the cutting unit for movement between these position. Three height-adjusting units 34 are mounted on tubular frame 24 and operate to raise and lower the height of the cutting blades. A wheel drive handle 36 applies and removes power from engine 16 to the drive wheels 38 on which the power unit is mounted. The power source for engine 16 is mounted toward the rear of the main frame so that its weight can be used to improve traction of the drive wheels 38. A blade drive handle 40 is operated to apply and remove power from engine 16 to the cutting blades located within the cutting unit 14.

Figure 4:
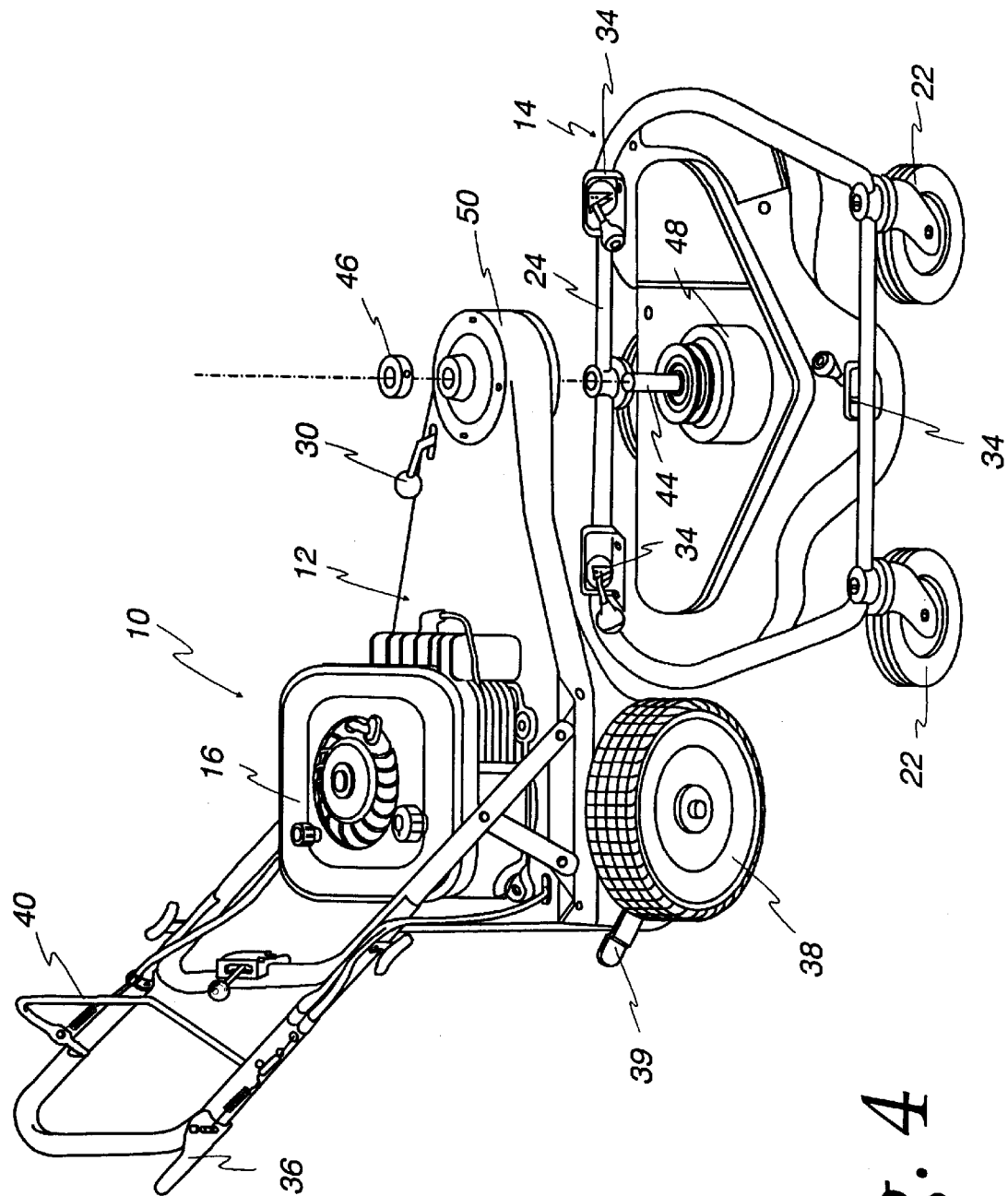
FIG. 4 is an exploded perspective view showing the cutting device separated into its power unit and cutting unit components.

FIG. 4 shows the cutting device 10 partly disassembled, with the cutting unit 14 separated from the power unit 12. As indicated in FIG. 4, a shaft 44 extends through the forward end of power unit 12, and is secured in place by a locking collar 46. This locks an inner pivot head 48 carried on the cutting unit within an outer pivot head 50 carried on power unit 12. This forms the pivot coupling 20 mentioned above.

Figures 5, 5A:
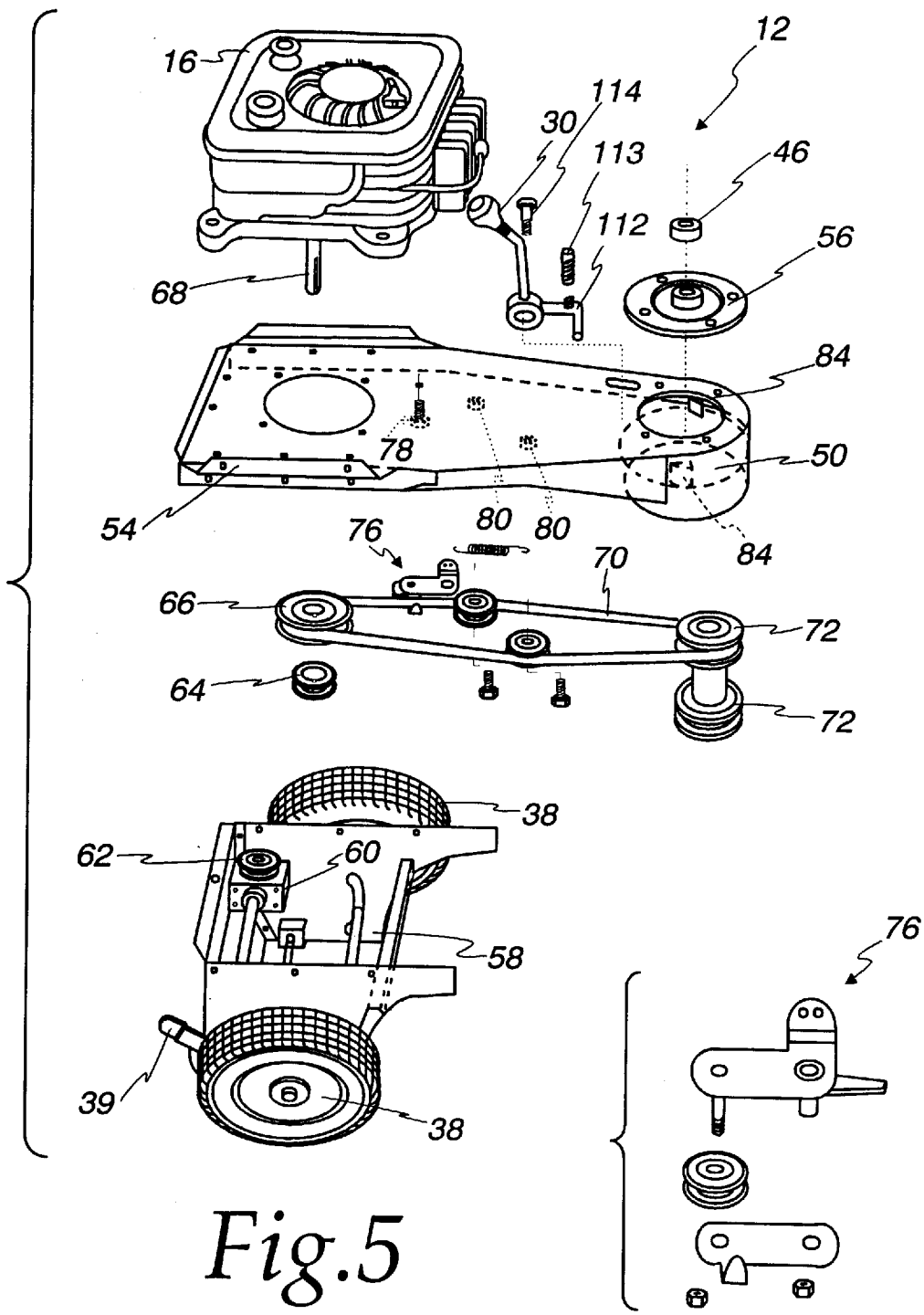
FIG. 5 is an exploded perspective view of the power unit thereof.
FIG. 5a shows the tensioning device of FIG. 5 in greater detail.
Figure 6:
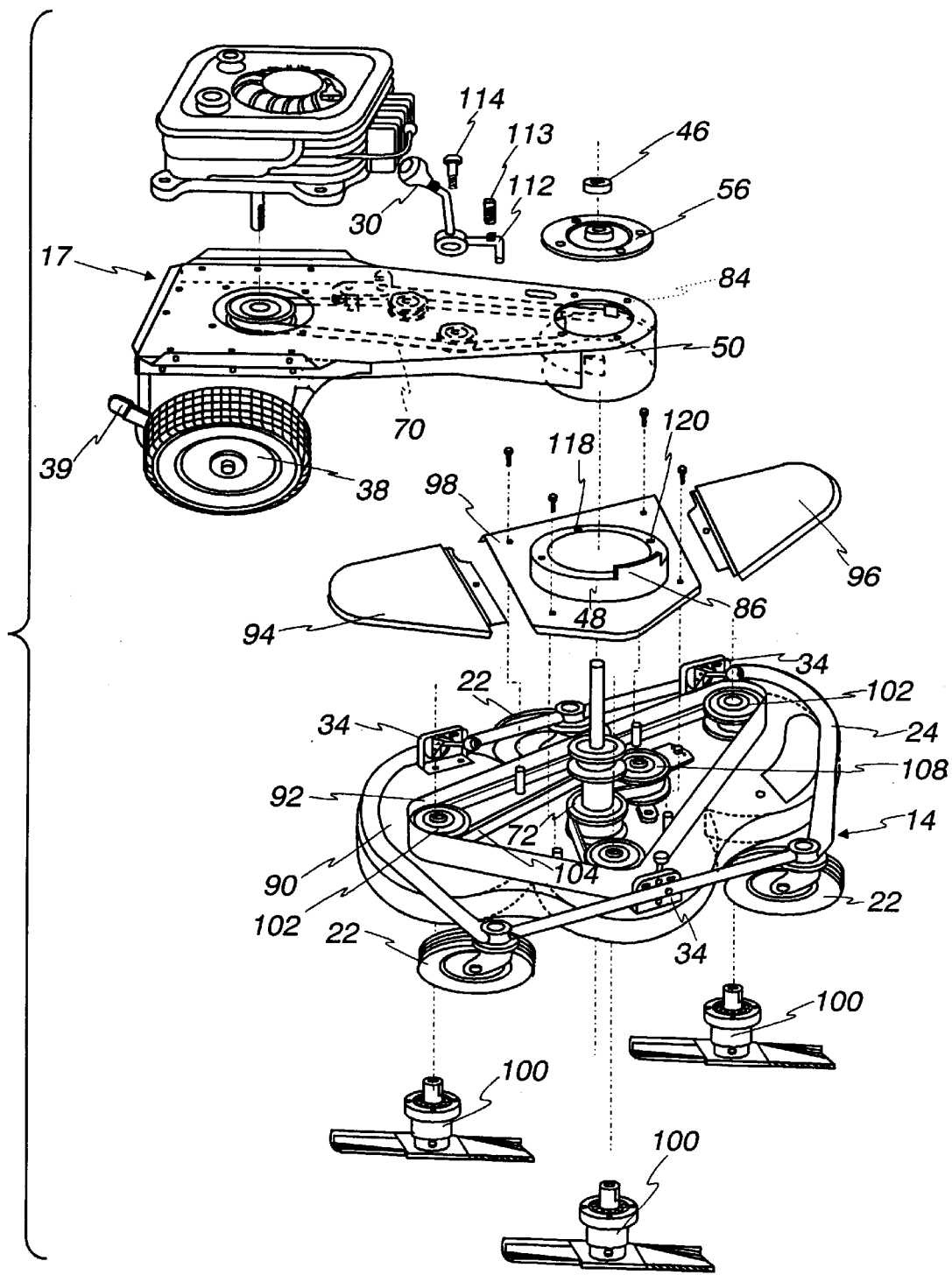
FIG. 6 is an exploded perspective view of the cutting device showing the cutting unit in greater detail.

Turning now to FIGS. 5 and 6, power unit 12 includes a main frame 54 which carries the outer pivot head 50. An access cover 56 encloses the outer pivot head 50, protecting the pivot connection from inadvertent contamination. As can be seen in FIG. 6, outer pivot head 50 has a pair of internal teeth or stop members 84. The stops 84 engage an upstanding tooth 86 carried on the internal pivot head 48. Stops 84 and tooth 86 cooperate to define the extent of angular rotation of cutting unit 14 about the connection point. In the preferred embodiment, the stops 84 and tooth 86 are arranged such that the cutting unit is allowed to pivot only between the positions indicated in FIGS. 2 and 3. Of course, other positions can be defined by adjusting the relative size and positioning of stop members 84 and/or tooth 86.

A lower housing 58 (see FIG. 5) encloses a gear box 60 which drives wheels 38. Gear box 60 is powered by a pulley 62 driven by a belt (not shown) connecting pulley 62 to a drive pulley 64. Drive pulley 64 and an engine pulley 66 are coupled to output shaft 68 of engine 16. A drive belt 70 couples engine pulley 66 to double pulley 72. A conventional tension adjustment member 76 is mounted to main frame 54 by a bolt 78. The tension adjustment 76 is in turn coupled to handle 40 to provide remote control of the driving power to the cutting unit (See FIGS. 1–4). Preferably, the belt tightening assembly 76 functions as a clutch which is normally disengaged, removing power to the cutting blades. The clutch can only be engaged by the operator while the cutting device is in use. In the preferred embodiment, the gear box 60, tension member 76 and engine 16 are commercially available, conventional units.

Turning again to FIG. 6, the cutting unit 14 includes a housing or cutting deck 90 which is mounted to tubular frame 24 by the height-adjustment members 34. A belt housing 92 is mounted atop cutting deck 90 and the belt covers 94, 96 and pivot plate 98 have been removed from the belt housing to show internal components. The inner pivot head 48, as shown, is mounted to the pivot plate 98 and is carried for rotation therewith. As can be seen in FIG. 6, a plurality of pulleys are arranged within belt housing 92. As indicated in FIG. 6, three cutting blade assemblies 100 are employed, and each are connected to a respective blade pulley 102. A tension adjustment pulley 108 is provided to account for belt stretching and to aid in the installation of a drive belt 104 during construction of the cutting unit. If desired, the drive belt 104 could be replaced by a chain or by a plurality of drive belts or chains.

Referring to FIGS. 5 and 6, release lever 30 includes a locking pawl 112 which is pivotally mounted to main frame 54 by bolt 114. Locking pawl 112, in turn, is received in either one of the two apertures 118, 120 formed in the internal pivot head, as can be seen in FIG. 6. When handle 30 is retracted, with the linkage illustrated in FIG. 6 rotated in a counterclockwise direction, pawl 112 is raised against the force of compressive spring 113, allowing inner pivot head 48 to rotate with respect to outer pivot head 50. In the preferred embodiment, rotation continues until alignment tooth 86 engages one of the stops 84, indicating a desired operating position has been attained. Handle 30 is then released, allowing pawl 112 to drop into either of the holes 118 or 120.

FIG. 7 shows the tubular frame 24 and its related components in greater detail. As mentioned, three height adjusters 34 are employed. As can be seen in FIG. 7, a housing 124 is employed, and generally resembles a L-shaped bracket. FIGS. 8a and 8b show housing 124 in greater detail. In FIG. 8a, a handle mounting plate 126 includes a pair of spaced walls 128 for receiving an operating shaft 130 therebetween. Operating shaft 130 includes an aperture 132 for receiving a roll pin 134, pivotally mounting the rod 130 to plate 126. The handles on the height adjusters are designed to collapse to a horizontal position, allowing the cutting unit to clear the power unit while rotating between operating positions, shown, for example, in FIGS. 2 and 3. FIG. 8b shows an alternative height adjuster assembly wherein the operating shaft 130 of FIG. 8a is replaced by a pull member 131 having a handle portion 132. The pull member is slidingly contained on plate 126 by a saddle member 133 secured to plate 126. A spring steel strap with tabs 135 is formed to accept the pull member 131. With the height adjuster of either FIG. 8a or FIG. 8b, the cutting deck is raised and lowered with respect to the tubular frame 24 which is supported at a fixed height above the ground by caster wheels 22.

FIG. 9 shows the belt drive unit of the cutting unit in greater detail. As can be seen in FIG. 9, tension adjusting pulley 108 is carried on a bracket 140 having an upstanding shaft 142. Bracket 140 is mounted for rotation about its mounting hole 144, secured by a bolt, not shown, to belt housing 92.

Turning now to FIG. 10, the cutting deck and blade assemblies are shown in greater detail. Cutting deck 90 includes an optional opening 148 which is normally covered by a plate 150. If desired, the plate 150 can be removed and a conventional exhaust chute can be installed about the opening 148. In FIG. 10, two of the three cutting blade assemblies 100 are illustrated. One of the cutting blade assemblies is shown exploded, and is seen to comprise a cutting blade 160, a mounting collar 162, drive shaft 164 and mounting collar 166.

The tubular frame 24 (see FIG. 7) has a generally trapezoidal or truncated triangular shape with rounded corners. The three swivel caster wheels make it possible to turn in a complete circle without lifting the mower and to allow continuous vegetation cutting while turning. When turning is completed and a straight path of travel is desired, the swivel casters are quickly and automatically reset. When cutting lawns, for example, improved cornering has been observed and more precise control in tight spots is possible, allowing the increased cutting width of the mower to be placed to greatest advantage. As mentioned, it is possible to maintain continuous contact with the ground surface being cut, even while the mower is turning. Lifting of the front end of the mower, which was previously required, has now been eliminated.

As can be seen in FIG. 6, the cutting device preferably has three rotating blades of equal length, although dissimilar sizes and/or other numbers of cutting blades (e.g., 2 or 4) can be accommodated. For example, if two cutting blades are employed on diametrically opposite sides of the pivot connection, the drive belt contacting the double pulley 72 can be readily routed within the cutting deck to provide the power to the cutting blades. In the preferred embodiment, the cutting deck has three lobes to accommodate the three cutting blades. However, if two cutting blades are employed, a bi-lobed load deck (generally in the shape of a figure eight) can be employed.

As mentioned, other numbers of cutting blades are possible. For example, with four cutting blades, a four-lobed deck can be employed with minimal modification, as will be seen with reference to FIGS. 12 and 13 to be described shortly, herein.

Figure 11:
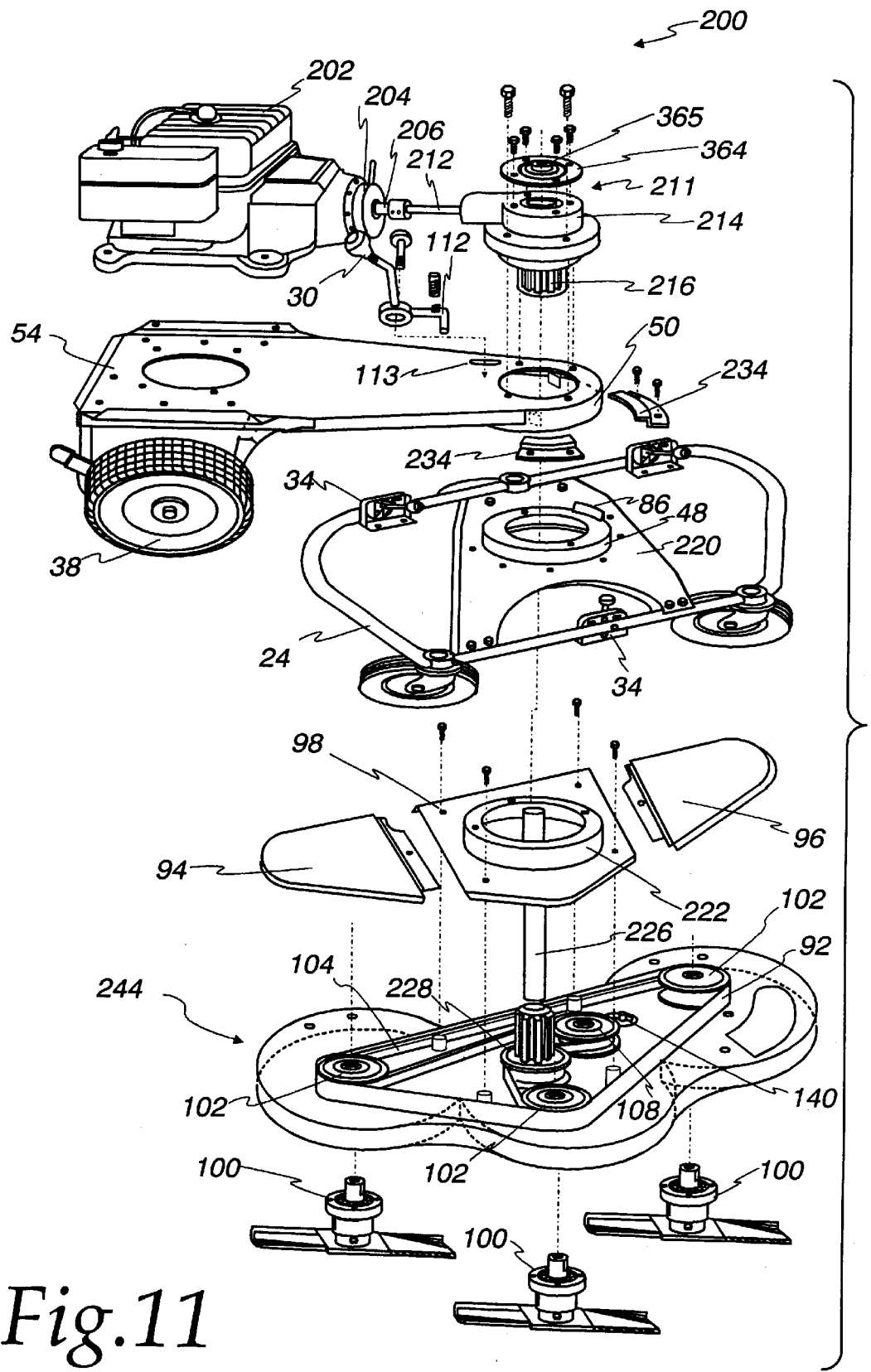
FIG. 11 is an exploded perspective view of an alternative cutting device.

Turning now to FIG. 11, the cutting device generally indicated at 200 which has similarities with respect to the cutting device 10 described above, including the single pivotal connection between the power unit and the cutting unit components. One notable difference, is that the power unit shown in FIG. 11 has an engine 202 coupled to a clutch 204 having a horizontal output shaft 206. The output shaft 206 is coupled through a drive shaft 212 to a gear box 214. Gear box 214 is of the 90 degree output, hollow shaft type and has an outer splined coupling 216. Gear box 214 can be mounted in a variety of different ways, however it is preferred that the gear box 214 be mounted on the main frame 54. Turning again to FIG. 11, a cylindrical tube 222 is mounted on pivot plate 98 and is received within the pivot head for added support, while providing a dust shield for working components of the drive train assembly. A vertical shaft 226 is mounted to the cutting deck housing and extends upwardly through tube 222, collar 48, pivot head 50, the outer spline coupling 216, gear box 214, receiving support at its upper end from bushing 365 located atop the gear box assembly generally indicated at 211.

As can be seen in FIG. 11, the single pivotal connection between the power unit and cutting unit is made between members mounted on cross-over bracket 220 and main frame 54. A cross-over bracket 220 provides a fixed height between tubular frame 24 and main frame 54, and, if desired, height adjusters at drive wheels 38 of the power unit can be eliminated. Height adjusters 34, as mentioned, move the cutting deck assembly (shown in the lower portion of FIG. 11) in vertical directions, beneath a tubular frame 24. As the cutting deck is raised and lowered, the inner and outer splined couplings 228, 216 are slid relative to each other, to provide varying amounts of overlapping telescoping engagement, while maintaining continuous power transmission between the engine and, ultimately, the cutting blades. Preferably, the shaft 226 is stationary, i.e. non-rotating, and is fixed at its lower end. As will be appreciated, the shaft 226 provides alignment of the power transmitting elements in the pivot connection, reducing wear and vibration of those elements. In summary, power is transmitted from the engine 202 on clutch 204, through shaft 212 and gear box 214 to the outer splined coupling 216. Engagement between the outer splined coupling and the inner splined coupling 228 causes power to be transmitted to the belt pulley portion of the inner splined coupling 228, and through drive belt 104 to drive pulleys 102. As indicated in FIG. 11, the blade assemblies 100 are directly coupled to the belt pulleys 102, and thus the blade assemblies receive drive power. The stationary shaft 226 maintains alignment as the blade assemblies 100 transmit shock pulses back through the drive source. In particular, the stationary shaft 226 maintains axial alignment of the splined coupling members 216, 228 and of the associated gear mechanism 214 which drives the outer splined member 216. An inner splined coupling 228 is secured by snap ring to shaft 226 and is mated with the outer spline coupling 216.

FIG. 12 shows an alternative cutting device generally indicated at 250. The engine 202 has an output shaft 251 with a belt pulley 252, which is coupled through drive belt 254 to a belt pulley 256 mounted on outer spline coupling 216. The inner splined shaft 228 is mounted to shaft 226 with a snap ring 260. The drive arrangement will be seen to bear certain similarities to that described above with reference to FIG. 11, except that the right angled gear drive is not required in the cutting device 250. Rather, power is transmitted from engine 202 to the outer splined shaft 216 through engagement of the drive belt with the belt pulley portion 256 thereof. As in the cutting device shown in FIG. 11, the cutting device 250 provides support for the upper end of stationary shaft 226 by bushing 365 mounted atop cover plate 364. The upper portion of FIG. 12 shows a stub shaft 367 protruding below cover plate 364. The outer splined coupling 216 is mounted to stub shaft 367 by bearing 352 and locking rings 360, 362. As in the preceding embodiment, the stationary support shaft 226 of cutting device 250 extends upwardly through the telescopically interfitting spline members 216, 228 holding those spline members in axial alignment with one another. Preferably, the same cutting deck portion 244 as that described above in FIG. 11 is employed in the cutting device 250. As in the preceding embodiment of cutting device 200, the cutting device 250 employs a stationary shaft 226 to provide a reference alignment between the cutting deck portion and the pivot connection members which provide power transmission and pivotal support between the power unit and the cutting deck. Various other drive arrangements are possible, and will become apparent to those skilled in art from studying the description and drawings herein.

Turning now to FIG. 13, a cutting deck is generally indicated at 300. As can be seen in the bottom portion of FIG. 13, the cutting deck 300 employs four cutting blades. An inner splined coupling 302 includes a toothed belt pulley portion 304. The drive belt 306 is preferably of the cog or gear type to maintain the drive pulleys 310 and 312 in synchronism with one another. In particular, it is important that the front drive blades 316 be maintained in timed relationship, because of their relatively close spacing to one another, and the desire to maintain the cutting blades at full length. For more compact cutting deck arrangements, it may be important to time the outer cutting blades 318 to the nearest adjacent forward cutting blade 316. The arrangement shown in FIG. 13 will accomplish this purpose. As can be seen in FIG. 13, the shaft 226 is rigidly attached by end mounting 227 to the cutting deck housing 320. The stationary shaft 226 provides relative alignment between the inner splined member 302 and the plane of the upper surface of the cutting deck housing 320, with which the belt train 306 is aligned.

Turning now to FIGS. 12 and 14, the drive system between the engine and cutting deck will be described in greater detail. Starting at the lower end of FIG. 14, shaft 226 is received in inner splined coupling 228 and a ball bearing support 350 is installed between the shaft 226 and the inner bore of splined coupling 228. As mentioned, the inner splined coupling 228 is received within the outer splined coupling 216 and snap ring 260 secures the lower end of the assembly to shaft 226. The upper end of shaft 226 is slidingly supported within the bushing 365. The cover plate 364 with the bushing 365 supports the upper end of shaft 226, helping the stationary shaft 226 to maintain alignment between main frame 54 and the pivotal connection/power drive elements to the cutting deck.

An advantage of cutting devices according to principles of the present invention is that cutting decks having different numbers of cutting blades, or different types of cutting blades, could be quickly and easily mounted to the same power unit, with the required connection being made, as explained above, at the single connection point between the drive unit and the power unit. The cutting device of the present invention also provides flexible operation necessary for cutting different types of vegetation. The preferred embodiment illustrated in the drawings is especially adapted for cutting grass. However, conventional string trimmer heads or articulated blades pivotally connected to hubs could be mounted in place of the preferred rigid monolithic cutting blades, if desired. Also, it will be readily appreciated that the cutting device of the present invention can be readily adapted for cutting heavier vegetation, such as "rough" areas on a golf course or farm. It may be advantageous, in such situations, to employ cutting blades having a saw-tooth edge or wavy edge for cutting heavier vegetation.

Further, commercial operations can employ a variety of different cutting units. A single power unit be assigned to these multiple cutting units, each adapted for a different cutting task. The quick exchange possible with the same connection point of cutting devices according to principles of the present invention makes rapid exchange of different cutting units possible.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:

1. A device for cutting vegetation, comprising:
    a power unit including a source of drive power mounted on a support, and a first pivot connection part carried on the support;
    a cutting unit including a frame, a deck carried on the frame, and a second pivot connection part carried on the frame;
    said first and said second pivot connection parts joined together and cooperating so that the cutting unit is pivotally connected to the power unit about a pivot axis;
    a plurality of cutting blades rotatably mounted on the deck so as to be spaced from the pivot axis; and
    coupling means for coupling the source of drive power to the cutting blades;
    the first and the second pivot parts include outer and inner interfitting concentric hubs;
    angular positioning means for positioning the cutting unit at first and second angular positions with respect to the body, the angular positioning means including interfering stop members carried on said outer and said inner interfitting concentric hubs.

2. The device of claim 1 wherein the device includes three cutting blades mounted within the deck in a triangular pattern, centered about the pivot axis.

3. The device of claim 1 further comprising a plurality of adjustable leveling means coupling the deck to the frame.

4. The device of claim 1 further comprising a plurality of caster wheels carried by the deck for pivot support of the deck on a ground surface.

5. The device of claim 1 wherein the device includes two cutting blades mounted within the deck on opposed sides of the pivot axis.

6. The device of claim 1 wherein the outer hub is carried on the power unit and the inner hub is carried on the cutting unit.

7. The device of claim 1 wherein the coupling means comprises a shaft disposed about the pivot axis and carrying upper and lower pulleys and first and second belts coupling the upper and lower pulleys to the source of drive power and to the cutting blades.

8. The device of claim 1 wherein the deck is lobed, with each lobe receiving one of said cutting blades.

9. A device for cutting vegetation, comprising:
    a power unit including a source of drive power mounted on a support, and a first pivot connection part carried on the support;
    a cutting unit including a frame, a deck carried on the frame, at least one cutting blade rotatably mounted on the deck and a second pivot connection part carried on the frame;
    coupling means for coupling the source of drive power to the cutting blade;
    said first and said second pivot parts include outer and inner interfitting concentric hubs which are joined together and which cooperate so that the cutting unit is pivotally connected to the power unit about a pivot axis.

10. The device of claim 9 wherein the outer hub is carried on the power unit and the inner hub is carried on the cutting unit.

11. A device for cutting vegetation, comprising:
    a power unit including a source of drive power mounted on a support, and a first pivot connection part carried on the support;

a cutting unit including a frame, a deck carried on the frame, at least one cutting blade rotatably mounted on the deck and a second pivot connection part carried on the frame;

coupling means for coupling the source of drive power to the cutting blade;

said first and said second pivot connection parts joined together and cooperating so that the cutting unit is pivotally connected to the power unit about a pivot axis;

angular positioning means for positioning the cutting unit at first and second angular positions with respect to the power unit; and said first and said second pivot parts include outer and inner interfitting concentric hubs and the angular positioning means includes interfering stop members carried on said outer and said inner interfitting concentric hubs.

12. A device for cutting vegetation, comprising:

a power unit including a source of drive power mounted on a support, and a first pivot connection part carried on the support;

a cutting unit including a frame, a deck carried on the frame, and a second pivot connection part carried on the frame;

said first and said second pivot connection parts joined together and cooperating so that the cutting unit is pivotally connected to the power unit about a pivot axis;

a plurality of cutting blades rotatably mounted on the deck so as to be spaced from the pivot axis;

coupling means for coupling the source of drive power to the cutting blades;

angular positioning means for positioning the cutting unit at first and second angular positions with respect to the power unit; and said first and said second pivot parts include outer and inner interfitting concentric hubs and the angular positioning means includes interfering stop members carried on said outer and said inner interfitting concentric hubs.

13. A device for cutting vegetation, comprising:

a power unit including a source of drive power mounted on a support, and a first pivot connection part carried on the support;

a cutting unit including a frame, a deck carried on the frame, and a second pivot connection part carried on the frame;

said first and said second pivot connection parts joined together and cooperating so that the cutting unit is pivotally connected to the power unit about a pivot axis;

a plurality of cutting blades rotatably mounted on the deck so as to be spaced from the pivot axis;

coupling means for coupling the source of drive power to the cutting blades;

the first and the second pivot parts include outer and inner interfitting concentric hubs;

angular positioning means for positioning the cutting unit at first and second angular positions with respect to the power unit, the angular positioning means including interfering stop members carried on said outer and said inner interfitting concentric hubs; and a lock means for locking the cutting unit at at least one angular position with respect to the power unit.

14. A device for cutting vegetation, comprising:

a power unit including a source of drive power mounted on a support, and a first pivot connection part carried on the support;

a cutting unit including a frame, a deck carried on the frame, and a second pivot connection part carried on the frame;

said first and said second pivot parts include outer and inner interfitting concentric hubs;

said first and said second pivot connection parts joined together and cooperating so that the cutting unit is pivotally connected to the power unit about a pivot axis;

a plurality of cutting blades rotatably mounted on the deck so as to be spaced from the pivot axis; and coupling means for coupling the source of drive power to the cutting blades.

15. The device of claim 14 wherein the outer hub is carried on the power unit and the inner hub is carried on the cutting unit.

16. The device of claim 15 wherein the device includes three cutting blades mounted within the deck in a triangular pattern, centered about the pivot axis.

17. The device of claim 15 wherein the coupling means comprises a shaft disposed about the pivot axis and carrying upper and lower pulleys and first and second belts coupling the upper and lower pulleys to the source of drive power and to the cutting blades.

18. The device of claim 15 wherein the deck is lobed, with each lobe receiving one of said cutting blades.

19. The device of claim 15 further comprising a lock means for locking the cutting unit at at least one angular position with respect to the power unit.

20. The device of claim 15 further comprising angular positioning means for positioning the cutting unit at first and second angular positions with respect to the power unit.

21. The device of claim 15 further comprising a plurality of adjustable leveling means coupling the deck to the frame.

22. The device of claim 15 further comprising a plurality of caster wheels carried by the deck for pivot support of the deck on a ground surface.

23. The device of claim 15 wherein the device includes two cutting blades mounted within the deck on opposed sides of the pivot axis.

* * * * *